US012060489B2

(12) United States Patent
Frisch et al.

(10) Patent No.: US 12,060,489 B2
(45) Date of Patent: Aug. 13, 2024

(54) TIRE PROVIDED WITH AN INNER LAYER MADE FROM AT LEAST AN ISOPRENE ELASTOMER, A REINFORCING RESIN AND A METAL SALT

(71) Applicant: COMPAGNIE GENERALE DES ETABLISSEMENTS MICHELIN, Clermont-Ferrand (FR)

(72) Inventors: Auriane Frisch, Clermont-Ferrand (FR); Joel Barbouteau, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 151 days.

(21) Appl. No.: 16/759,906

(22) PCT Filed: Oct. 30, 2018

(86) PCT No.: PCT/FR2018/052687
§ 371 (c)(1),
(2) Date: Apr. 28, 2020

(87) PCT Pub. No.: WO2019/086798
PCT Pub. Date: May 9, 2019

(65) Prior Publication Data
US 2020/0325308 A1    Oct. 15, 2020

(30) Foreign Application Priority Data

Oct. 30, 2017  (FR) ...................... 1760203

(51) Int. Cl.
| C08L 9/00 | (2006.01) |
| B60C 1/00 | (2006.01) |
| C08K 3/04 | (2006.01) |
| C08K 3/10 | (2018.01) |
| C08K 3/36 | (2006.01) |
| C08K 5/092 | (2006.01) |
| C08K 5/36 | (2006.01) |
| C08K 11/00 | (2006.01) |

(52) U.S. Cl.
CPC .............. *C08L 9/00* (2013.01); *B60C 1/0008* (2013.01); *C08K 3/04* (2013.01); *C08K 3/10* (2013.01); *C08K 3/36* (2013.01); *C08K 5/092* (2013.01); *C08K 5/36* (2013.01); *C08K 11/005* (2013.01)

(58) Field of Classification Search
CPC ........... C08L 9/00; B60C 1/0008; C08K 3/04; C08K 3/10; C08K 3/36
USPC ....................................................... 523/161
See application file for complete search history.

(56) References Cited

U.S. PATENT DOCUMENTS

| 5,871,597 | A | 2/1999 | Vasseur |
| 5,977,238 | A | 11/1999 | Labauze |
| 6,013,718 | A | 1/2000 | Cabioch et al. |
| 6,169,137 | B1 | 1/2001 | Vasseur |
| 6,503,973 | B2 | 1/2003 | Robert et al. |
| 6,610,261 | B1 | 8/2003 | Custodero et al. |
| 6,747,087 | B2 | 6/2004 | Custodero et al. |
| 6,774,255 | B1 | 8/2004 | Tardivat et al. |
| 6,815,473 | B2 | 11/2004 | Robert et al. |
| 6,835,769 | B2 | 12/2004 | Custodero et al. |
| 6,849,754 | B2 | 2/2005 | Deschler et al. |
| 7,199,175 | B2 | 4/2007 | Vasseur |
| 7,217,751 | B2 | 5/2007 | Purel et al. |
| 7,250,463 | B2 | 7/2007 | Durel et al. |
| 7,312,264 | B2 | 12/2007 | Gandon-Pain |
| 7,488,468 | B1 | 2/2009 | Tardivat et al. |
| 7,799,862 | B2 | 9/2010 | Chauvin |
| 7,820,771 | B2 | 10/2010 | Lapra et al. |
| 7,825,183 | B2 | 11/2010 | Robert et al. |
| 7,834,074 | B2 | 11/2010 | Brunelet et al. |
| 7,882,874 | B2 | 2/2011 | Robert et al. |
| 7,893,147 | B2 | 2/2011 | Otsuki |
| 7,900,667 | B2 | 3/2011 | Vasseur |
| 8,277,590 | B2 | 10/2012 | Delfino et al. |
| 8,344,063 | B2 | 1/2013 | Marechal et al. |
| 8,455,584 | B2 | 6/2013 | Robert et al. |
| 8,461,269 | B2 | 6/2013 | Varagniat et al. |
| 8,492,475 | B2 | 7/2013 | Araujo Da Silva et al. |
| 8,492,479 | B2 | 7/2013 | Robert et al. |
| 8,507,397 | B2 | 8/2013 | Cortial et al. |
| 8,865,803 | B2 | 10/2014 | Miyazaki |
| 8,883,929 | B2 | 11/2014 | Gandon-Pain et al. |

(Continued)

FOREIGN PATENT DOCUMENTS

| CN | 1463280 A | 12/2003 |
| CN | 102260381 A | 11/2011 |

(Continued)

OTHER PUBLICATIONS

International Search Report dated Feb. 12, 2019, in corresponding PCT/FR2018/052687 (4 pages).

(Continued)

*Primary Examiner* — Doris L Lee

(74) *Attorney, Agent, or Firm* — VENABLE LLP

(57) ABSTRACT

The present disclosure relates to tires, at least one internal layer of which exhibits good mechanical properties and reduced rolling resistance, the said internal layer comprising a rubber composition based on at least 80 to 100 phr of an isoprene elastomer, a reinforcing filler predominantly comprising carbon black, 1 to 45 phr of reinforcing resin, a salt of an alkaline earth, alkali or lanthanide metal, and a crosslinking system.

11 Claims, No Drawings

(56) References Cited

U.S. PATENT DOCUMENTS

| | | |
|---|---|---|
| 8,957,155 B2 | 2/2015 | Seeboth et al. |
| 9,010,393 B2 | 4/2015 | Araujo Da Silva et al. |
| 9,023,928 B2 | 5/2015 | Miyazaki et al. |
| 9,145,494 B2 | 9/2015 | Veyland et al. |
| 9,273,197 B2 | 3/2016 | Miyazaki |
| 9,650,492 B2 | 5/2017 | Makiuchi et al. |
| 9,714,339 B2 | 7/2017 | Veyland et al. |
| 9,902,204 B2 | 2/2018 | Lardjane et al. |
| 9,919,563 B2 | 3/2018 | Lardjane et al. |
| 10,040,976 B2 | 8/2018 | Doisneau et al. |
| 11,161,962 B2 | 11/2021 | Barbouteau et al. |
| 2001/0036991 A1 | 11/2001 | Robert et al. |
| 2001/0039308 A1 | 11/2001 | Custodero et al. |
| 2002/0183436 A1 | 12/2002 | Robert et al. |
| 2003/0212185 A1 | 11/2003 | Vasseur |
| 2004/0051210 A1 | 3/2004 | Tardivat et al. |
| 2004/0092647 A1 | 5/2004 | Chauvin |
| 2004/0132880 A1 | 7/2004 | Durel et al. |
| 2004/0249048 A1* | 12/2004 | Mangeret .................. C08K 5/54 524/492 |
| 2005/0004297 A1 | 1/2005 | Durel et al. |
| 2006/0089445 A1 | 4/2006 | Gandon-Pain |
| 2006/0094831 A1 | 5/2006 | Choi et al. |
| 2006/0128841 A1* | 6/2006 | Sandstrom .............. C08L 21/00 524/100 |
| 2006/0217481 A1 | 9/2006 | Otsuki |
| 2007/0084537 A1 | 4/2007 | Hotaka |
| 2007/0112120 A1 | 5/2007 | Vasseur |
| 2008/0009564 A1 | 1/2008 | Robert et al. |
| 2008/0026244 A1 | 1/2008 | Barbotin et al. |
| 2008/0132644 A1 | 6/2008 | Lapra et al. |
| 2008/0156404 A1 | 7/2008 | Brunelet et al. |
| 2008/0319125 A1 | 12/2008 | Boswell et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2010/0145089 A1 | 6/2010 | Mignani et al. |
| 2010/0168306 A1 | 7/2010 | Barbotin et al. |
| 2010/0181006 A1 | 7/2010 | Delfino et al. |
| 2010/0184912 A1 | 7/2010 | Marechal et al. |
| 2010/0204359 A1 | 8/2010 | Robert et al. |
| 2010/0216935 A1 | 8/2010 | Boswell et al. |
| 2010/0249270 A1 | 9/2010 | Robert et al. |
| 2010/0252156 A1 | 10/2010 | Robert et al. |
| 2011/0021702 A1 | 1/2011 | Gandon-Pain et al. |
| 2011/0094649 A1 | 4/2011 | Miyazaki |
| 2011/0152458 A1 | 6/2011 | Araujo Da Silva et al. |
| 2011/0294949 A1 | 12/2011 | Sakaki et al. |
| 2011/0294953 A1 | 12/2011 | Seeboth et al. |
| 2011/0319646 A1 | 12/2011 | Boswell et al. |
| 2012/0135857 A1 | 5/2012 | Cortial et al. |
| 2012/0157585 A1* | 6/2012 | Makiuchi .................. C08K 5/005 524/356 |
| 2012/0184634 A1 | 7/2012 | Chen et al. |
| 2012/0184658 A1* | 7/2012 | Miyazaki .................. B60C 1/00 524/495 |
| 2012/0208948 A1 | 8/2012 | Gandon-Pain et al. |
| 2012/0283372 A1 | 11/2012 | Veyland et al. |
| 2012/0285601 A1 | 11/2012 | Miyazaki |
| 2014/0090764 A1 | 4/2014 | Miyazaki |
| 2014/0102611 A1 | 4/2014 | Miyazaki |
| 2014/0124113 A1 | 5/2014 | Miyazaki et al. |
| 2014/0235125 A1 | 8/2014 | Doisneau et al. |
| 2014/0350138 A1 | 11/2014 | Cladiere et al. |
| 2015/0007922 A1 | 1/2015 | Lardjane et al. |
| 2015/0013873 A1 | 1/2015 | Lardjane et al. |
| 2015/0087744 A1 | 3/2015 | Yong et al. |
| 2015/0183983 A1 | 7/2015 | Veyland et al. |
| 2018/0057665 A1 | 3/2018 | Miyazaki |
| 2018/0258262 A1 | 9/2018 | Oshimo et al. |
| 2019/0255884 A1 | 8/2019 | Barbouteau et al. |
| 2020/0062928 A1 | 2/2020 | Barbouteau et al. |

FOREIGN PATENT DOCUMENTS

| | | |
|---|---|---|
| CN | 102428131 A | 4/2012 |
| CN | 102448970 A | 5/2012 |
| CN | 103764745 A | 4/2014 |
| EP | 1127909 A1 | 8/2001 |
| EP | 1707402 A1 | 10/2006 |
| EP | 2484720 A1 | 8/2012 |
| EP | 2730609 A1 | 5/2014 |
| EP | 3293224 A1 | 3/2018 |
| EP | 3336139 A1 | 6/2018 |
| FR | 2729671 A1 | 7/1996 |
| FR | 2740778 A1 | 5/1997 |
| FR | 2765882 A1 | 1/1999 |
| FR | 2869618 A1 | 11/2005 |
| JP | 2005-231458 A | 9/2005 |
| WO | 97/36724 A2 | 10/1997 |
| WO | 99/09036 A1 | 2/1999 |
| WO | 99/16600 A1 | 4/1999 |
| WO | 00/73373 A1 | 12/2000 |
| WO | 01/92402 A1 | 12/2001 |
| WO | 02/10269 A2 | 2/2002 |
| WO | 02/30939 A1 | 4/2002 |
| WO | 02/31041 A1 | 4/2002 |
| WO | 02/83782 A1 | 10/2002 |
| WO | 03/016387 A1 | 2/2003 |
| WO | 2004/096865 A1 | 11/2004 |
| WO | 2005/087859 A1 | 9/2005 |
| WO | 2006/023815 A1 | 3/2006 |
| WO | 2006/061064 A1 | 6/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2007061550 A1 | 5/2007 |
| WO | 2007/062669 A1 | 6/2007 |
| WO | 2007/098080 A2 | 8/2007 |
| WO | 2008/003434 A1 | 1/2008 |
| WO | 2008/003435 A1 | 1/2008 |
| WO | 2008/055986 A2 | 5/2008 |
| WO | 2008/080535 A1 | 7/2008 |
| WO | 2008/141702 A1 | 11/2008 |
| WO | 2009/000750 A1 | 12/2008 |
| WO | 2009/000752 A1 | 12/2008 |
| WO | 2010/072685 A1 | 7/2010 |
| WO | 2010/133492 A1 | 11/2010 |
| WO | 2011/029938 A1 | 3/2011 |
| WO | 2013/008798 A1 | 1/2013 |
| WO | 2013/017422 A1 | 2/2013 |
| WO | 2013/092096 A1 | 6/2013 |
| WO | 2013/117476 A1 | 8/2013 |
| WO | 2013/117477 A1 | 8/2013 |
| WO | 2013/141693 A1 | 9/2013 |
| WO | 2014/016344 A1 | 1/2014 |
| WO | 2014/016346 A1 | 1/2014 |
| WO | 2017/170654 A1 | 10/2017 |

OTHER PUBLICATIONS

S. Brunauer et al., "Adsoprtion of Gases in Multimolecular Layers", J. Am. Chem. Soc., vol. 60, pp. 309-319 (1938).

R. Mildenburg, et al., Hydrocarbon Resins, VCH, chapter 5, pp. 141-146 (1997).

* cited by examiner

TIRE PROVIDED WITH AN INNER LAYER MADE FROM AT LEAST AN ISOPRENE ELASTOMER, A REINFORCING RESIN AND A METAL SALT

BACKGROUND

The present invention relates to tyres, and more particularly to those exhibiting at least one internal layer exhibiting a high stiffness.

Tyre designers must comply with strict specifications which set a large number of often conflicting technical requirements. Rubber compositions must in particular obey a requirement of sufficient stiffness while maintaining good cohesion of the mixture. The combined improvement in these properties remains an ongoing concern for designers, the one generally being made at the expense of the other.

In order to ensure good stiffness, it has been known for many years to use tyres and rubber compositions exhibiting high contents of reinforcing fillers. However, in known way, the increase in the stiffness of a rubber composition by increasing the content of filler can be damaging to the hysteresis properties and thus to the rolling resistance of tyres. In point of fact, it is an ongoing aim to lower the rolling resistance of tyres in order to reduce the consumption of fuel and thus to protect the environment.

A high stiffness can also be obtained by using a "concentrated" vulcanization system, that is to say comprising in particular relatively high contents of sulfur and of vulcanization accelerator. However, such a concentrated vulcanization system is damaging to the aging of the composition.

Finally, a high stiffness can be obtained by incorporating certain reinforcing resins, as disclosed in Application WO 02/10269.

Thus, there exists a need to find means for improving the endurance of tyres comprising compositions having high stiffness, without damaging the rolling resistance.

On continuing its research studies, the Applicant Company has discovered that the use of a salt of an alkaline earth, alkali or lanthanide metal in a composition comprising more than 80 phr of isoprene elastomer and a reinforcing resin makes it possible to improve the endurance, in particular by the improvement in the resistance to crack propagation and in the elongation at break, without damaging, indeed even while improving, the rolling resistance.

SUMMARY

Thus, a subject-matter of the present invention is in particular a tyre, at least one internal layer of which comprises a rubber composition based on at least:
- 80 to 100 phr of an isoprene elastomer,
- a reinforcing filler predominantly comprising carbon black,
- 1 to 45 phr of reinforcing resin,
- a salt of an alkaline earth, alkali or lanthanide metal,
- a crosslinking system.

The invention and its advantages will be easily understood in the light of the description and implementational examples which follow.

I—DEFINITIONS

The expression "part by weight per hundred parts by weight of elastomer" (or phr) should be understood as meaning, within the meaning of the present invention, the part by weight per hundred parts by weight of elastomer or rubber.

In the present document, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b). In the present document, when an interval of values is denoted by the expression "from a to b", the interval represented by the expression "between a and b" is also and preferentially denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of sulfur (polysulfide, disulfide, monosulfide) bridges.

When reference is made to a "predominant" compound, this is understood to mean, within the meaning of the present invention, that this compound is predominant among the compounds of the same type in the composition, that is to say that it is the one which represents the greatest amount by weight among the compounds of the same type, for example more than 50%, 60%, 70%, 80%, 90%, indeed even 100%, by weight, with respect to the total weight of the compound type. Thus, for example, a predominant reinforcing filler is the reinforcing filler representing the greatest weight with respect to the total weight of the reinforcing fillers in the composition. On the contrary, a "minor" compound is a compound which does not represent the greatest fraction by weight among the compounds of the same type, for example less than 50%, 40%, 30%, 20%, 10%, indeed even less.

Within the context of the invention, the carbon-based products mentioned in the description can be of fossil or biosourced origin. In the latter case, they may partially or completely result from biomass or be obtained from renewable starting materials resulting from biomass. Polymers, plasticizers, fillers and the like are concerned in particular.

Unless otherwise indicated, the components described in the present document form part of the composition of the at least one internal layer of the tyre according to the present invention. Their respective incorporation contents correspond to their contents in the internal layer composition of the tyre according to the present invention. Thus, unless otherwise indicated, when the expression "the composition" is used, reference is made to the composition of the at least one internal layer of the tyre according to the present invention.

II—DESCRIPTION OF THE INVENTION

II-1 Elastomeric Matrix

The composition according to the invention comprises from 80 to 100 phr of an isoprene elastomer. Thus, the composition according to the invention can contain just one isoprene elastomer or a mixture of an isoprene elastomer with one or more other diene elastomers.

"Isoprene elastomer" is understood to mean, in a known way, an isoprene homopolymer or copolymer, in other words a diene elastomer selected from the group consisting of natural rubber (NR), which can be plasticized or peptized, synthetic polyisoprenes (IR), the various isoprene copolymers and the mixtures of these elastomers. Mention will in particular be made, among isoprene copolymers, of isobutene/isoprene (butyl rubber IIR), isoprene/styrene (SIR), isoprene/butadiene (BIR) or isoprene/butadiene/styrene (SBIR) copolymers. Preferably, the isoprene elastomer is selected from the group comprising or consisting of natural rubber, a synthetic polyisoprene and one of their mixtures; more preferably, the isoprene elastomer is natural rubber.

Preferably, the isoprene elastomer comprises a content by weight of cis-1,4-bonds of at least 90%, more preferentially of at least 98%, with respect to the weight of the isoprene elastomer.

Preferentially, the content of isoprene elastomer, preferably natural rubber, is from 90 to 100 phr, more preferentially from 95 to 100 phr. In particular, the content of isoprene elastomer, more preferably of natural rubber, is very preferentially 100 phr.

Thus, according to the invention, the composition can comprise from 0 to 20 phr of one or more other diene elastomers other than an isoprene elastomer. Preferably, the content of diene elastomer other than isoprene elastomer is within a range extending from 0 to 10 phr, preferably from 0 to 5 phr. More preferably, the composition does not comprise a diene elastomer other than an isoprene elastomer.

It should be remembered here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of moieties or units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Given these definitions, diene elastomer capable of being used in the compositions in accordance with the invention is understood more particularly to mean:

a) any homopolymer obtained by polymerization of a conjugated diene monomer having from 4 to 12 carbon atoms;

b) any copolymer obtained by copolymerization of one or more conjugated dienes with one another or with one or more vinylaromatic compounds having from 8 to 20 carbon atoms;

c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

d) a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the above type (a) or (b).

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized by a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling to a reinforcing inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type. Advantageously, the diene elastomer of the composition does not comprise an epoxidized isoprene elastomer, preferably not an epoxidized elastomer, or contains less than 10 phr, preferably less than 5 phr, thereof.

According to the invention, the diene elastomer other than an isoprene elastomer can be chosen, for example, from the group of highly unsaturated diene elastomers consisting of polybutadienes (abbreviated to "BRs"), butadiene copolymers and the mixtures of these elastomers. Such copolymers are more preferentially selected from the group consisting of butadiene/styrene copolymers (SBRs), butadiene/acrylonitrile copolymers (NBRs), butadiene/styrene/acrylonitrile copolymers (NSBRs) or a mixture of two or more of these compounds.

Furthermore, whether they contain just one isoprene elastomer or a mixture of at least one isoprene elastomer and of one or more diene elastomers, the compositions of the invention can be used in combination with any type of synthetic elastomer other than a diene elastomer, indeed even with polymers other than elastomers, for example thermoplastic polymers, it being understood that the elastomeric matrix (including the diene and synthetic elastomers and the abovementioned polymers) predominantly comprises isoprene elastomer. Preferably, the composition according to the invention does not contain a thermoplastic elastomer or contains less than 10 phr, preferably less than 5 phr, thereof.

II-2 Reinforcing Filler

The composition of the tyre according to the invention advantageously comprises a reinforcing filler, known for its abilities to reinforce a rubber composition which can be used for the manufacture of tyres.

According to the invention, the composition of the internal layer of the tyre according to the invention comprises a reinforcing filler predominantly comprising carbon black.

The blacks which can be used in the context of the present invention can be any black conventionally used in tyres or their treads ("tyre-grade" blacks). Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, Applications WO 97/36724 or WO 99/16600).

Mention may be made, as examples of organic fillers other than carbon blacks, of functionalized polyvinyl organic fillers, such as described in Applications WO 2006/069792, WO 2006/069793, WO 2008/003434 and WO 2008/003435.

Advantageously, the carbon black predominantly comprises a carbon black exhibiting a BET specific surface of greater than or equal to 15 $m^2/g$, preferably of greater than or equal to 50 $m^2/g$, preferably a BET specific surface within a range extending from 50 to 120 $m^2/g$, more preferably from 70 to 120 $m^2/g$. Furthermore, the carbon black advantageously exhibits a COAN oil absorption index of greater than 80 ml/100 g, preferably a COAN oil absorption index within a range extending from 80 to 100 ml/100 g, preferably from 90 to 100 ml/100 g.

The BET specific surface of the carbon blacks is measured according to Standard D6556-10 [multipoint (a minimum of 5 points) method—gas: nitrogen'relative pressure $p/p_0$ range: 0.1 to 0.3]. The COAN, or Compressed Oil Absorption Number, of the carbon blacks is measured according to Standard ASTM D3493-16.

According to one embodiment of the invention, the reinforcing filler additionally comprises silica. According to the invention, if silica is used in the composition of the internal layer of the tyre according to the invention, it is present in a minor way, that is to say that the ratio of carbon black to the content of silica in the composition is greater than 1.

When the reinforcing filler comprises silica, it is preferable for the ratio of carbon black to the content of silica in the composition to be within a range extending from 2 to 10, preferably from 3 to 8.

The silica which can be used in the context of the present invention can be any silica known to a person skilled in the art, in particular any precipitated or fumed silica exhibiting a BET specific surface and a CTAB specific surface which are both less than 450 $m^2/g$, preferably from 30 to 400 $m^2/g$.

The BET specific surface of the silica is determined in a known way by gas adsorption using the Brunauer-Emmett-Teller method described in The Journal of the American Chemical Society, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface of the silica is determined according to French Standard NF T 45-007 of November 1987 (method B).

Preferably, the silica exhibits a BET specific surface of less than 200 $m^2/g$ and/or a CTAB specific surface of less than 220 $m^2/g$, preferably a BET specific surface within a range extending from 125 to 200 $m^2/g$ and/or a CTAB specific surface within a range extending from 140 to 170 $m^2/g$.

Mention will be made, as silicas which can be used in the context of the present invention, for example, of the highly dispersible precipitated silicas (termed "HDSs") Ultrasil 7000 and Ultrasil 7005 from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

A person skilled in the art will understand that, as filler equivalent to the silica described in the present document, use might be made of a reinforcing filler of another nature, in particular organic nature, provided that this reinforcing filler is covered with a layer of silica or else comprises functional sites, in particular hydroxyl sites, at its surface which require the use of a coupling agent in order to establish the bond between the filler and the elastomer.

When the reinforcing filler comprises silica, the composition of the internal layer of the tyre according to the invention can comprise a coupling agent or be devoid of it.

In order to couple the reinforcing silica to the diene elastomer, use is made, in a well-known way, of an at least bifunctional coupling agent (or bonding agent) intended to provide a satisfactory connection, of chemical and/or physical nature, between the silica (surface of its particles) and the diene elastomer. Use is made in particular of organosilanes or polyorganosiloxanes which are at least bifunctional.

A person skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

Mention may in particular be made of alkoxysilane polysulfide compounds, especially bis(trialkoxysilylpropyl) polysulfides, very particularly bis(3-triethoxysilylpropyl) disulfide (abbreviated to "TESPD") and bis(3-triethoxysilylpropyl) tetrasulfide (abbreviated to "TESPT"). It should be remembered that TESPD, of formula $[(C_2H_5O)_3Si(CH_2)_3S]_2$, is in particular sold by Degussa under the names Si266 or Si75 (in the second case, in the form of a mixture of disulfide (at 75% by weight) and of polysulfides). TESPT, of formula $[(C_2H_5O)_3Si(CH_2)_3S]_4$, is sold in particular by Degussa under the name Si69 (or X50S when it is supported at 50% by weight on carbon black), in the form of a commercial mixture of polysulfides $S_x$ with a mean value for x which is approximately 4.

Advantageously, the composition according to the invention does not comprise a coupling agent or comprises less than 11%, preferably less than 5%, preferably less than 4%, by weight thereof, with respect to the weight of silica. When the composition comprises a coupling agent, the content of coupling agent can be within a range extending from 0.1 to 0.5 phr, preferably from 0.1 to 0.3 phr.

According to another embodiment of the invention, the reinforcing filler comprises exclusively carbon black.

Whether or not silica is present in the composition according to the invention, the reinforcing filler can comprise a mixture of carbon black, preferably a mixture of carbon black exhibiting a BET specific surface of less than 70 $m^2/g$, known as coarse black, and of carbon black exhibiting a BET specific surface of greater than or equal to 70 $m^2/g$, known as fine black. The use of this mixture of carbon black is particularly preferred when the reinforcing filler of the composition comprises exclusively carbon black.

In the present document, "coarse carbon black" is understood to mean a carbon black exhibiting a BET specific surface of less than 70 $m^2/g$. In the present document, "fine carbon black" is understood to mean a carbon black exhibiting a BET specific surface of greater than or equal to 70 $m^2/g$.

The coarse carbon blacks which can be used in the context of the present invention can be any black conventionally used in tyres or their treads ("tyre-grade" blacks) of the 400, 500, 600 or 700 series (ASTM grades), such as, for example, the blacks N550, N683 and N772.

The fine carbon blacks which can be used in the context of the present invention can be any black conventionally used in tyres or their treads (so-called pneumatic grade blacks) of the 100, 200 or 300 series (ASTM grades), such as, for example, blacks N115, N134, N234, N326, N330, N339, N347, N375.

Preferably, the coarse carbon black exhibits a BET specific surface of less than 50 $m^2/g$, preferably a BET specific surface within a range extending from 32 to 49 $m^2/g$. More preferably, the coarse carbon black exhibits a COAN oil absorption number of less than 90 ml/100 g, preferably of less than 87 ml/100 g, preferably of less than 70 ml/100 g. Advantageously, the coarse carbon black exhibits a COAN within a range extending from 50 to 85 ml/100 g, preferably from 55 to 85 ml/100 g, preferably a COAN within a range extending from 50 to 69 ml/100 g.

Preferably, the fine carbon black exhibits a BET specific surface within a range extending from 70 to 100 $m^2/g$, preferably from 75 to 100 $m^2/g$. More preferably, the fine carbon black exhibits a COAN oil absorption number of greater than or equal to 90 ml/100 g. Advantageously, the coarse carbon black exhibits a COAN within a range extending from 90 to 110 ml/100 g, preferably from 95 to 110 ml/100 g.

Whether the reinforcing filler comprises a mixture of carbon black and of silica, or exclusively carbon black, the total content of reinforcing filler in the composition is preferably within a range extending from 15 to 200 phr, preferably from 15 to 150 phr, preferably from 20 to 120 phr, preferably from 25 to 100 phr, preferably from 30 to 80 phr.

When the reinforcing filler comprises silica, the content of silica in the composition can, for example, be within a range extending from 5 to 70 phr, preferably from 5 to 40 phr, more preferably from 5 to 20 phr.

When the reinforcing filler comprises exclusively carbon black, the content of carbon black in the composition is preferably within a range extending from 15 to 70 phr, preferably from 30 to 65 phr.

Preferably, when the reinforcing filler comprises a mixture of fine carbon black and of coarse carbon black, the composition can advantageously comprise from 5 to 60 phr of coarse black and from 10 to 30 phr of fine black. Advantageously, the content of coarse carbon black is within a range extending from 10 to 60 phr, preferably from 15 to 60 phr, preferably from 15 to 50 phr, preferably from 20 to 40 phr; and the content of coarse carbon black is within a range extending from 10 to 25 phr, preferably from 10 to 20 phr.

II-3 Reinforcing Resin

The composition according to the invention also comprises a reinforcing resin (or hardening resin) known to a person skilled in the art for stiffening rubber compositions, in particular by increasing their Young's modulus or also the complex dynamic shear modulus G*. Thus, a rubber composition to which a reinforcing resin has been added will exhibit a higher stiffness, in particular a Young's modulus or the complex dynamic shear modulus G*, than this composition without reinforcing resin.

A person skilled in the art can measure the Young's modulus (also known as modulus of elasticity or even tensile modulus) of rubber compositions according to Standard ASTM 412-98a. or according to Standard NF EN ISO 527-2 (2012) on a test specimen of type A according to DIN EN ISO 3167 (2014). He can also measure the complex dynamic shear modulus G* on a viscosity analyser (Metravib VA4000), in a way well known to a person skilled in the art according to Standard ASTM D 5992-96, for example by recording the response of a sample of crosslinked composition (cylindrical test specimen with a thickness of 4 mm and a cross section of 400 $mm^2$), subjected to a simple alternating sinusoidal shear stress, at the frequency of 10 Hz, under the defined conditions of temperature (for example at 60° C.) according to Standard ASTM D 1349-99 or, as the case may be, at a different temperature. A strain amplitude sweep is carried out from 0.1% to 50% (outward cycle) and then from 50% to 0.1% (return cycle). For the return cycle, the complex dynamic shear modulus G* at a predetermined strain (for example 10%) is shown.

In this context, the increase in the stiffness is brought about by polymerization or crosslinking of the reinforcing resin so as to form, in the vast majority of cases, a three-dimensional network. This crosslinking most of the time requires the use of a co-agent (often called a curing agent) and/or of heating (at a temperature of greater than or equal to 100° C., indeed even of greater than or equal to 130° C.).

The content of reinforcing resin in the composition of the internal layer of the tyre according to the invention is within a range extending from 1 to 45 phr. Advantageously, the composition comprises from 0.5 to 30 phr of a reinforcing resin and from 0.5 to 15 phr of a co-agent of the reinforcing resin.

The reinforcing resins commonly used are phenolic resins, epoxy resins, benzoxazine resins, bismaleimides, polyurethane resins, and the like.

The reinforcing resins conventionally used in rubber compositions for tyres are based on a methylene acceptor/donor system. The terms "methylene acceptor" and "methylene donor" are well known to a person skilled in the art and are widely used to denote compounds capable of reacting together (crosslinking). The crosslinking of the resin is brought about, during the curing of the rubber matrix, by the formation of methylene (—CH$_2$—) bridges between the carbons in the ortho and/or para positions of the phenolic nuclei of the resin and the methylene donor, thus creating a three-dimensional resin network which is superimposed on and interpenetrated with the reinforcing filler/elastomer network, on the one hand, and with the elastomer/sulfur network, on the other hand (if the crosslinking agent is sulfur). Examples of such methylene acceptor and donor are described in WO 02/10269.

There exist many other reinforcing resins which can be used in the context of the present invention, if appropriate combined with a co-agent of the reinforcing resin. Mention may in particular be made, by way of example, of those described in Applications WO 2011/029938, WO 2008/080535, WO 2014/016346, WO2013/017422 or WO 2014/016344.

According to the invention, the reinforcing resin is preferably selected from the group comprising or consisting of phenolic resins, epoxy resins, benzoxazine resins, bismaleimides, polyurethane resins and their mixtures.

In a particularly advantageous way, the reinforcing resin is a phenolic resin chosen from the group comprising or consisting of resins based on polyphenol, on alkylphenol, on aralkylphenol and their mixtures. Preferably, the reinforcing resin is a phenolic resin selected from the group comprising or consisting of resins based on hydroxybenzene, on bisphenol (preferably diphenylolpropane or diphenylolmethane), on naphthol, on cresol, on t-butylphenol, on octylphenol, on nonylphenol, on resorcinol, on phloroglucinol, on cardanol, on xylenol (in particular 3,5-xylenol), on 1-naphthol, on 2-naphthol, on 1,5-naphthalenediol, on 2,7-naphthalenediol, on pyrogallol, on 2-methylhydroquinone, on 4-methylcatechol, on 2-methylcatechol, on orcinol (5-methylbenzene-1,3-diol), on hydroquinone (benzene-1,4-diol) and on their mixtures.

The reinforcing resin can also be an epoxy resin selected from the group comprising or consisting of aromatic epoxy compounds, alicyclic epoxy compounds, aliphatic epoxy compounds and their mixtures; preferably, the reinforcing resin is an epoxy resin selected from the group comprising or consisting of 2,2-bis[4-(glycidyloxy)phenyl]propane, poly[(o-cresyl glycidyl ether)-co-formaldehyde], poly[(phenyl glycidyl ether)-co-formaldehyde], poly[(phenyl glycidyl ether)-co-(hydroxybenzaldehyde glycidyl ether)] and their mixtures.

The content of reinforcing resin in the composition is advantageously within a range extending from 0.5 to 30 phr, preferably from 2 to 20 phr, more preferably from 3 to 15 phr.

The reinforcing resins within the meaning of the present invention should not be confused with "plasticizing" hydrocarbon resins, which are by nature miscible (i.e. compatible) at the contents used with the polymer compositions for which they are intended, so as to act as true diluents. Plasticizing hydrocarbon resins have in particular been described, for example, in Application WO 2013/092096 or in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tyre rubber field (5.5. "Rubber Tires and Mechanical Goods"). They can be aliphatic, cycloaliphatic, aromatic, hydrogenated aromatic or of the aliphatic/aromatic type.

According to the invention, the composition of the internal layer of the tyre can additionally comprise a co-agent of the reinforcing resin (or curing agent). A person skilled in the art knows which co-agent to combine with which reinforcing resin based on his general knowledge or on the abovementioned documents.

According to the invention, the co-agent of the reinforcing resin can be selected from the group comprising or consisting of methylene donors, polyaldehydes, polyamines, polyimines, polyamines, polyaldimines, polyketimines, acid anhydrides and their mixtures.

When the reinforcing resin used is a phenolic resin, the co-agent of the reinforcing resin is preferably a methylene donor selected from the group comprising or consisting of hexamethylenetetramine, hexa(methoxymethyl)melamine, hexa(ethoxymethyl)melamine, paraformaldehyde polymers, N-methylol derivatives of melamine, and their mixtures, preferably from the group comprising or consisting of hexamethylenetetramine, hexa(methoxymethyl)melamine, hexa(ethoxymethyl)melamine and their mixtures.

When the reinforcing resin used is an epoxy resin, the co-agent of the reinforcing resin is preferably an amino curing agent selected from the group consisting of polyamines (in particular aliphatic polyamines, alicyclic polyamines, aliphatic amines and aromatic polyamines), dicyandiamides, hydrazides, imidazole compounds, sulfonium salts, onium salts, ketimines, acid anhydrides and their mixtures; preferably, the co-agent of the reinforcing resin is an amino curing agent selected from the group consisting of ethylenediamine, diethylenetriamine, triethylenetetramine, 1,8-diaminooctane, 1,3-bis(aminomethyl)cyclohexane, m-xylylenedia mine, p-xylylenediamine, m-phenylenediamine, 2,2-bis(4-aminophenyl)propane, diaminodiphenylmethane, 3,5-diethyl-2,4-diaminotoluene, 3,5-diethyl-2,6-diamintoluene, methyl thio-toluene diamine, dimethyl thio-toluene diamine, diaminodiphenyl sulfone, 2,2'-bis(4-aminophenyl)-p-diisopropylbenzene, 3,3'-diaminobenzidine, 4,4'-(4,4'-isopropylidenediphenoxy)bis (phthalic anhydride) polyanhydride, pyromellitic dianhydride and their mixtures.

A person skilled in the art knows how to adjust the content of co-agent of the reinforcing resin as a function of the content of reinforcing resin used. Preferably, the content of co-agent of the reinforcing resin in the composition is within a range extending from 0.5 to 15 phr, preferably from 1 to 10 phr, more preferably from 2 to 8 phr. Thus, the composition of the internal layer of the tyre according to the invention can optionally comprise from 0.5 to 15 phr, preferably from 1 to 10 phr, more preferably from 2 to 8 phr, of a co-agent of the reinforcing resin.

II-4 Salt of an Alkaline Earth, Alkali or Lanthanide Metal

The composition of the internal layer of the tyre according to the invention comprises an alkaline earth, alkali or lanthanide metal salt.

The salt of an alkaline earth, alkali or lanthanide metal is advantageously an acetylacetonate of an alkaline earth, alkali or lanthanide metal.

Preferably, the alkaline earth, alkali or lanthanide metal of the salt is selected from the group consisting of lithium, sodium, potassium, calcium, magnesium, lanthanum, cerium, praseodymium, neodymium, samarium, erbium and their mixtures. More preferably, the salt of an alkaline earth, alkali or lanthanide metal is a magnesium or neodymium salt, preferably a magnesium salt. In other words, the salt of an alkaline earth, alkali or lanthanide metal is advantageously a magnesium or neodymium acetylacetonate, preferably a magnesium acetylacetonate.

The content of the alkaline earth, alkali or lanthanide metal salt can, for example, be within a range extending from 0.1 to 5 phr, preferably from 0.5 to 4 phr and more preferentially from 0.5 to 2 phr.

II-5 Crosslinking System

The crosslinking system can be based on molecular sulfur and/or on sulfur donors and/or on peroxide, which are well known to a person skilled in the art.

Among the peroxides, which are well known to a person skilled in the art, it is preferable to use, for the invention, a peroxide chosen from the family of the organic peroxides. Preferably, the peroxide is an organic peroxide selected from the group comprising or consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl 4,4-di(tert-butylperoxy)valerate, OO-(t-butyl) O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and the mixtures of the latter, more preferentially from the group consisting of dicumyl peroxide, n-butyl 4,4-di(tert-butylperoxy)valerate, OO-(t-butyl) O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and the mixtures of the latter. Various packaged products, known under their trade names, are available commercially; mention may be made of Dicup from Hercules Powder Co., Perkadox Y12 from Noury van der Lande, Peroximon F40 from Montecatini Edison S.p.A., Trigonox from Noury van der Lande, Varox from R. T. Vanderbilt Co. or also Luperko from Wallace & Tiernan Inc.

Preferentially, the amount of peroxide to be used for the requirements of the invention is less than or equal to 3 phr. Preferably, the amount of peroxide in the composition is within a range extending from 0.1 to 3 phr. More preferentially, the amount of peroxide in the composition is within a range extending from 0.2 to 2.5 phr, preferably from 0.25 to 1.8 phr.

The crosslinking system is preferably a vulcanization system based on molecular sulfur (and/or on a sulfur-donating agent).

Advantageously, the sulfur content in the composition is greater than 2.5 phr; preferably, the sulfur content is within a range extending from 3 to 10 phr, preferably from 3 to 7 phr.

The composition of the internal layer of the tyre according to the invention advantageously comprises a vulcanization accelerator, which is preferably selected from the group consisting of accelerators of the family of the thiazoles and their derivatives, of the family of the sulfenamides, of the family of the thioureas and of their mixtures. Advantageously, the vulcanization accelerator is selected from the group consisting of 2-mercaptobenzothiazyl disulfide (MBTS), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), morpholine disulfide, N-morpholino-2-benzothiazolesulfenamide (MBS), dibutylthiourea (DBTU) and of their mixtures.

The content of vulcanization accelerator is preferentially within a range extending from 0.5 to 3 phr, preferably from 0.6 to 2.5 phr, more preferably from 0.7 to 2 phr. In a particularly advantageous way, the ratio of the content of sulfur to the content of vulcanization accelerator is greater than 1, preferably greater than 2, more preferably greater than 3. In particular, the ratio of the content of sulfur to the content of vulcanization accelerator is preferentially between 1 and 10, preferably between 2 and 9, more preferably between 3 and 8.

II-6 Various Additives

The composition of the internal layer of the tyre according to the invention can also comprise all or part of the normal additives customarily used in elastomer compositions for tyres, such as, for example, plasticizers which are liquid at 23° C. (exhibiting in particular a Tg of less than −20° C.), plasticizing hydrocarbon resins exhibiting a high Tg (in particular of greater than 20° C.), pigments, protective agents, such as antiozone waxes, chemical antiozonants, antioxidants, or anti-fatigue agents, well known to a person skilled in the art.

The composition according to the invention can also comprise stearic acid or one of its salts. Mention may be made, as an example of stearic acid salt, of zinc stearate or cadmium stearate. The content of stearic acid or of one of its salts can advantageously be within a range extending from 0.3 to 3 phr, preferably from 0.4 to 2 phr, preferably from 0.5 to 1 phr.

The composition according to the invention can additionally comprise an antioxidant selected from the group consisting of substituted p-phenylenediamines, substituted diphenylamines, substituted triphenylamines, quinoline derivatives and their mixtures. Preferably, the antioxidant is selected from the group consisting of substituted p-phenylenediamines and their mixtures. The content of antioxidant can advantageously be within a range extending from 1 to 5 phr, preferably from 2 to 3 phr.

The composition according to the invention can also comprise a metal oxide. The metal oxide can be selected from the group consisting of the oxides of the metals of Groups II, IV, V, VI, VII and VIII, and their mixtures. Preferably, the metal oxide is selected from the group consisting of the oxides of zinc, magnesium, cobalt, nickel and their mixtures. More preferably, the metal oxide is a zinc oxide. The content of metal oxide can advantageously be within a range extending from 2 to 20 phr, preferably from 6 to 10 phr. Advantageously, the ratio of metal oxide to stearic acid or one of its salts is greater than 3; preferably, the ratio of metal oxide to stearic acid or one of its salts is within a range extending from 3 to 20, preferably from 5 to 15, preferably from 5 to 10.

II-7 Tyres

The tyre according to the invention comprises at least one internal layer, the composition of which is as defined above.

According to the invention, the internal layer can be selected from the group consisting of carcass plies, crown plies, bead-wire fillings, crown feet, decoupling layers, edge rubbers, padding rubbers, the tread underlayer and the combinations of these internal layers. Preferably, the internal layer is selected from the group consisting of carcass plies, crown plies, crown feet, decoupling layers, edge rubbers and the combinations of these internal layers. In the present text, the term "edge rubber" is understood to mean a layer positioned in the tyre directly in contact with the end of a reinforcing ply, with the end of a reinforcing element or with another edge rubber.

The present invention relates in particular to tyres intended to equip motor vehicles of passenger vehicle type, SUVs ("Sport Utility Vehicles"), or two-wheel vehicles (in particular motorcycles), or aircraft, or also industrial vehicles chosen from vans, heavy-duty vehicles—that is to say, underground trains, buses, heavy road transport vehicles (lorries, tractors, trailers) or off-road vehicles, such as heavy agricultural vehicles or earthmoving equipment—, and others.

Tyres are concerned both in the raw state (that is to say, before curing) and in the cured state (that is to say, after crosslinking or vulcanization).

II-8 Preparation of the Rubber Compositions

The compositions used in the context of the present invention can be manufactured in appropriate mixers, using two successive phases of preparation well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following stages:
a) incorporating a reinforcing filler in a diene elastomer during a first stage (said "non-productive" stage), everything being kneaded thermomechanically (for example, in one or more goes), until a maximum temperature of between 110° C. and 190° C. is reached;
b) cooling the combined mixture to a temperature of less than 100° C.;
c) subsequently incorporating, during a second stage (said "productive" stage), a crosslinking system;
d) kneading everything up to a maximum temperature of less than 110° C.

The reinforcing resin can be introduced either during the non-productive phase (a) or during the productive phase (c). When the composition additionally comprises a co-agent of the reinforcing resin, the reinforcing resin is preferentially introduced during the non-productive phase (a) and the co-agent of the reinforcing resin during the productive phase (c).

By way of example, the non-productive phase is carried out in a single thermomechanical stage during which, in a first step, all the base constituents necessary (diene elastomer, reinforcing filler, reinforcing resin) are introduced into an appropriate mixer, such as a standard internal mixer, followed, in a second step, for example after kneading for one to two minutes, by the other additives, optional additional agents for covering the filler or optional additional processing aids, with the exception of the crosslinking system. The total duration of the kneading, in this non-productive phase, is preferably between 1 and 15 min.

The first stage of kneading is generally carried out by incorporating the reinforcing filler in the elastomer, in one or more goes, while kneading thermomechanically. In the case where the reinforcing filler, in particular the carbon black, is already incorporated, in all or in part, in the elastomer in the form of a masterbatch, as is described, for example, in Applications WO 97/36724 and WO 99/16600, it is the masterbatch which is directly kneaded and, if appropriate, the other elastomers or reinforcing fillers present in the composition which are not in the masterbatch form, and also the additives other than the crosslinking system, are incorporated.

After cooling the mixture thus obtained, the crosslinking system and, if appropriate, the co-agent of the reinforcing resin are then incorporated in an external mixer, such as an open mill, maintained at a low temperature (for example between 40° C. and 100° C.). The combined mixture is then mixed (productive phase) for a few minutes, for example between 2 and 15 min.

The final composition thus obtained can subsequently be calendered, for example in the form of a sheet or of a plaque, in particular for a laboratory characterization, or else extruded, for example in order to form a rubber profiled element used in the manufacture of a tyre.

The curing can be carried out, in a way known to a person skilled in the art, at a temperature generally of between 130° C. and 200° C., under pressure, for a sufficient time which can vary, for example, between 5 and 90 min as a function in particular of the curing temperature, of the crosslinking system adopted, of the kinetics of crosslinking of the composition under consideration or also of the size of the tyre comprising an abovementioned profiled element.

III—EXAMPLES

III-1 Measurements and Test Used

Resistance to Crack Propagation:

The rate of cracking (Vp) was measured on test specimens of rubber compositions using a cyclic fatigue device (Elastomer Test System) of the 381 type from MTS, as explained below.

The resistance to cracking is measured using repeated tensile actions on a test specimen initially accommodated (after a first tensile cycle) and then notched. The tensile test specimen is composed of a rubber plaque of parallelepipedal shape, for example with a thickness of between 1 and 2 mm, with a length between 130 and 170 mm and with a width between 10 and 15 mm, the two side edges each being covered in the direction of the length with a cylindrical rubber strip (diameter 5 mm) making possible anchoring in the jaws of the tensile testing device. The test specimens thus prepared are tested in the fresh state. The test was carried out in air, at a temperature of 20° C., 60° C. or 80° C. After accommodation, 3 very fine notches with a length of between 15 and 20 mm are produced using a razor blade, at mid-width and aligned in the direction of the length of the test specimen, one at each end and one at the centre of the latter, before starting the test. At each tensile cycle, the degree of strain of the test specimen is automatically adjusted so as to keep the energy restitution level (amount of energy released during the progression of the crack) constant at a value of less than or equal to approximately 1500 J/m$^2$. The crack propagation rate is measured in nanometres per cycle.

The data presented in Table 1 below correspond to the percentage of increase in crack propagation from the initial state to the aged state (thermal-oxidative aging for 7 days in an oven at a temperature of 77° C.). The greater the percentage of increase in crack propagation, the more sensitive the composition is to cracking.

Hysteresis Losses:

The hysteresis losses (P60) are measured by rebound at 60° C. having energy applied measured at the eighth impact at 40% strain. The value, measured in %, is the difference between the energy supplied and the energy restored, relative to the energy supplied.

In a way well known to a person skilled in the art, the lower the absolute value of P60, the lower will be the hysteresis of the composition and thus the more improved will be the rolling resistance. The results are presented in base 100 performance with respect to the control C. A value greater than that of the control C indicates an improved result, that is to say a better rolling resistance.

Tensile Tests:

These tensile tests make it possible to determine the moduli of elasticity and the properties at break and are based on Standard NF ISO 37 of December 2005 on a type-2 dumbbell test specimen. The elongation at break thus measured at 100° C. is expressed as % of elongation.

The elongation at break results are shown in base 100, the value 100 being assigned to the control. A result of less than 100 indicates a decrease in the value concerned and, conversely, a result of greater than 100 will indicate an increase in the value concerned.

III-2 Preparation of the Compositions

The tests which follow are carried out in the following way: the diene elastomer, the reinforcing filler, the reinforcing resin and also the various other ingredients, with the exception of the vulcanization system and of the co-agent of the reinforcing resin, are successively introduced into an internal mixer (final degree of filling: approximately 70% by volume), the initial vessel temperature of which is approximately 60° C. Thermomechanical working (non-productive phase) is then carried out in one stage, which lasts in total approximately from 3 to 4 min, until a maximum "dropping" temperature of 165° C. is reached.

The mixture thus obtained is recovered and cooled and then sulfur, a vulcanization accelerator and the co-agent of the reinforcing resin are incorporated on a mixer (homofinisher) at 30° C., everything being mixed (productive phase) for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

The samples thus produced were cured for 25 minutes at 150° C. or 90 minutes at 160° C. in a bell press. Some samples were additionally subjected, after curing, to a thermal-oxidative aging stage for a period of time of 7 or 14 days in an oven at a temperature of 77° C., this being done in order to compare the kinetics of the properties measured. All the samples were analyzed after being cooled for 24 hours at ambient temperature.

III-3 Rubber Test

The object of the examples presented in Table 1 is to compare the resistance to crack propagation of a composition in accordance with the invention (I1) with that of control compositions (C1, C2, C3) which differ from the composition in accordance with the present invention in that they do not comprise reinforcing resin (reinforcing resin+ co-agent of the reinforcing resin) and/or salt of an alkaline earth, alkali or lanthanide metal. Their formulations (in phr) and their properties have been summarized in Table 1 below.

For their part, the object of the examples presented in Table 2 is to compare different properties of compositions in accordance with the invention (I1, I2, I3, I4) with respect to those of control compositions (C4, C5, C6, C7, C8). The control compositions C4, C5 and C6 differ from the compositions in accordance with the invention I1, I3 and I4 respectively in that they do not comprise a salt of an alkaline earth, alkali or lanthanide metal. The control compositions C7 and C8 differ from the composition in accordance with the invention I1 in that they comprise less than 80 phr of isoprene elastomer. Their formulations (in phr) and their properties have been summarized in Table 2 below.

TABLE 1

|  | C1 | C2 | C3 | I1 |
|---|---|---|---|---|
| NR (a) | 100 | 100 | 100 | 100 |
| N347 (b) | 50 | 50 | 50 | 50 |
| Reinforcing resin (c) |  |  | 4 | 4 |
| Curing agent (d) |  |  | 0.8 | 0.8 |
| Mg salt (e) |  | 1.8 |  | 1.8 |
| Co salt (f) | 1 | 1 | 1 | 1 |
| ZnO (g) | 8 | 8 | 8 | 8 |
| Stearic acid (h) | 1 | 1 | 1 | 1 |
| Antioxidant (i) | 2 | 2 | 2 | 2 |
| Sulfur | 5.5 | 5.5 | 5.5 | 5.5 |
| Accelerator (j) | 0.9 | 0.9 | 0.9 | 0.9 |
| Properties |  |  |  |  |
| % increase Vp | 210 | 222 | 213 | 135 |

TABLE 2

|  | C4 | I1 | I2 | C5 | I3 | C6 | I4 | C7 | C8 |
|---|---|---|---|---|---|---|---|---|---|
| NR (a) | 100 | 100 | 100 | 100 | 100 | 100 | 100 | 60 | 40 |
| SBR (k) |  |  |  |  |  |  |  | 40 | 60 |
| N347 (b) | 50 | 50 | 50 |  |  | 40 | 40 | 50 | 50 |
| N550 (l) |  |  |  | 50 | 50 |  |  |  |  |
| Silica (m) |  |  |  |  |  | 10 | 10 |  |  |
| Reinforcing resin (c) | 4 | 4 | 4 | 4 | 4 | 4 | 4 | 4 | 4 |
| Curing agent (d) | 0.8 | 0.8 | 0.8 | 0.8 | 0.8 | 0.8 | 0.8 | 0.8 | 0.8 |
| Mg salt (e) |  | 1.8 | 3 |  | 1.8 |  | 1.8 | 1.8 | 1.8 |
| Co salt (f) | 1 | 1 | 1 | 1 | 1 | 1 | 1 | 1 | 1 |
| ZnO (g) | 8 | 8 | 8 | 8 | 8 | 8 | 8 | 8 | 8 |
| Stearic acid (h) | 1 | 1 | 1 | 1 | 1 | 1 | 1 | 1 | 1 |
| Antioxidant (i) | 2 | 2 | 2 | 2 | 2 | 2 | 2 | 2 | 2 |
| Sulfur | 5.5 | 5.5 | 5.5 | 5.5 | 5.5 | 5.5 | 5.5 | 5.5 | 5.5 |
| Accelerator (j) | 0.9 | 0.9 | 0.9 | 0.9 | 0.9 | 0.9 | 0.9 | 0.9 | 0.9 |
| Initial properties (after curing) |  |  |  |  |  |  |  |  |  |
| EB % at 100° C. | 100 | 107 | 120 | 94 | 106 | 107 | 120 | 63 | 55 |
| Hysteresis performance | 100 | 103 | 101 | 105 | 124 | 113 | 114 | 104 | 108 |
| Properties after ageing 7 days at 77° C. |  |  |  |  |  |  |  |  |  |
| EB % at 100° C. | 100 | 113 | 122 | 98 | 119 | 118 | 131 | 67 | 53 |
| Hysteresis performance | 100 | 102 | 101 | 125 | 124 | 112 | 112 | 105 | 107 |

TABLE 2-continued

|  | C4 | I1 | I2 | C5 | I3 | C6 | I4 | C7 | C8 |
|---|---|---|---|---|---|---|---|---|---|
| Properties after ageing 14 days at 77° C. | | | | | | | | | |
| EB % at 100° C. | 100 | 117 | 153 | 113 | 124 | 126 | 164 | 86 | 87 |
| Hysteresis performance | 100 | 107 | 100 | 96 | 134 | 108 | 103 | 103 | 100 |

(a) to (j): see Table 1

The results presented in Table 1 show that the composition in accordance with the invention makes it possible to reduce the increase in the crack propagation after thermal-oxidative aging. Thus, the tyres, the internal layers of which comprise a composition in accordance with the invention, exhibit an extended lifetime with respect to tyres, the internal layers of which comprise a control composition.

Furthermore, it is demonstrated in Table 2 above that the compositions in accordance with the invention make it possible to improve the cohesion of the mixture (elongation at break) without damaging the hysteresis (indeed even while improving it), with respect to their respective controls which do not comprise a salt of an alkaline earth, alkali or lanthanide metal, this being the case even after thermal-oxidative aging. The inventors have also found that, when the elastomeric matrix comprises less than 80 phr of isoprene elastomer, the mechanical properties of the mixture are no longer satisfactory.

The invention claimed is:

1. A tire comprising at least one internal layer which comprises a rubber composition based on at least:
   80 to 100 phr of natural rubber;
   a reinforcing filler predominantly comprising carbon black and 5 to 20 phr of silica;
   3 to 15 phr of a reinforcing resin which is a novolak resin;
   a salt of an alkaline earth metal; and
   a crosslinking system,
   wherein the carbon black is a fine carbon black,
   wherein a total content of the reinforcing filler ranges from 30 to 80 phr, and
   wherein the rubber composition does not comprise a coupling agent.

2. The tire according to claim 1, wherein the carbon black exhibits a BET specific surface area of greater than or equal to 15 m²/g.

3. The tire according to claim 1, wherein a ratio of a content of carbon black to a content of silica in the rubber composition is within a range extending from 2 to 10.

4. The tire according to claim 1, wherein the reinforcing resin is a phenolic resin.

5. The tire according to claim 1, wherein the salt of the alkaline earth metal is an acetylacetonate of the alkaline earth metal.

6. The tire according to claim 1, wherein the salt of the alkaline earth metal is selected from the group consisting of calcium salts, magnesium salts—and mixtures thereof.

7. The tire according to claim 1, wherein a content of the alkaline earth metal salt in the rubber composition is within a range extending from 0.1 to 5 phr.

8. The tire according to claim 1, wherein the crosslinking system is a vulcanization system based on molecular sulfur, on a sulfur-donating agent, or on both molecular sulfur and a sulfur-donating agent.

9. The tire according to claim 1, wherein the internal layer is selected from the group consisting of carcass plies, crown plies, bead-wire fillings, crown feet, decoupling layers, edge rubbers, padding rubbers, tread underlayer and combinations thereof.

10. The tire according to claim 1, wherein the rubber composition further comprises a co-agent of the reinforcing resin.

11. The tire according to claim 10, wherein a content of co-agent of the reinforcing resin in the rubber composition is within a range extending from 0.5 to 15 phr.

* * * * *